United States Patent [19]

Nakamura et al.

[11] Patent Number: 5,433,075
[45] Date of Patent: Jul. 18, 1995

[54] EXHAUST SYSTEM FOR AN ENGINE

[75] Inventors: Yositaka Nakamura, Higashihiroshima; Keiji Araki, Saeki, both of Japan

[73] Assignee: Mazda Motor Corporation, Hiroshima, Japan

[21] Appl. No.: 267,246

[22] Filed: Jun. 29, 1994

[30] Foreign Application Priority Data

Jul. 9, 1993 [JP] Japan .................................. 5-170711
Mar. 31, 1994 [JP] Japan .................................. 6-064199

[51] Int. Cl.⁶ ............................................... F01N 7/00
[52] U.S. Cl. .................................... 60/322; 60/323
[58] Field of Search ................. 60/272, 273, 313, 322, 60/323, 324

[56] References Cited

U.S. PATENT DOCUMENTS

| | | | |
|---|---|---|---|
| 4,484,440 | 11/1984 | Oki | 60/323 |
| 4,658,581 | 4/1987 | Hirabayashi | 60/322 |
| 4,662,173 | 5/1987 | Wilkinson | 60/322 |
| 4,719,752 | 1/1988 | Hall | 60/322 |
| 5,016,439 | 5/1991 | Nitta | 60/322 |
| 5,159,811 | 11/1992 | Hefler | 60/322 |
| 5,331,810 | 7/1994 | Ingermann | 60/322 |

FOREIGN PATENT DOCUMENTS 3-32117 3/1991 Japan .

*Primary Examiner*—James C. Yeung
*Assistant Examiner*—Daniel J. O'Connor
*Attorney, Agent, or Firm*—Fish & Richardson

[57] ABSTRACT

An exhaust system for a power plant which includes an engine and a transmission connected with the engine, the exhaust system includes a plurality of independent exhaust pipes connected with the engine, the plurality of independent exhaust pipes being combined into a single combined portion, a common exhaust pipe connected with the combined portion at an upstream end portion thereof. The common exhaust pipe is supported on the transmission at an intermediate supporting portion thereof. One of the plurality of independent exhaust pipes and an upstream part of the common exhaust pipe are, when viewed from above, substantially parallel with a rolling axis of the power plant.

19 Claims, 7 Drawing Sheets

EXHAUST SYSTEM FOR AN ENGINE

BACKGROUND OF THE INVENTION

This invention relates to an exhaust system for an engine in which system a plurality of exhaust pipes are connected to a combined portion and a common exhaust pipe is connected to a downstream end of the combined portion.

There has been generally known an exhaust system in which a plurality of exhaust pipes are connected to a combined portion and a common exhaust pipe is connected to a downstream end of the combined portion. This system is found in a V-shaped engine or the like. For example, the system disclosed in Japanese Unexamined Utility Model Publication No. 3-32117 is constructed as follows. An exhaust manifold is mounted on an outer side wall of each bank of a V-shaped engine longitudinally mounted so that an engine output shaft extends in a lengthwise direction of an automotive vehicle. An exhaust pipe is connected to each exhaust manifold. These exhaust pipes are bent from opposite sides of a transmission housing toward the center with respect to a widthwise direction of the transmission housing at the back side of the engine. These exhaust pipes are connected to a combined portion behind the transmission housing and a common exhaust pipe is connected to a downstream end of the combined portion.

In the system disclosed in the above publication, the vibrations from the engine, the transmission, and the like are transmitted to the exhaust pipes and the common exhaust pipe, with the result that an exhaust pipe assembly including the exhaust pipes and common exhaust pipe vibrates. The vibrations generated in this manner, especially three-dimensional vibrations, are likely to exert a large force on the exhaust pipe assembly and a portion supporting this assembly.

More specifically, the exhaust pipe assembly is supported on the transmission housing normally at an intermediate portion of the common exhaust pipe. Since the exhaust pipes are both bent three-dimensionally and connected to the combined portion, the engine vibration is transmitted to the exhaust pipes. Further, the vibration generated due to the power plant bending is transmitted to the common exhaust pipe through the supporting portion thereof fixed to the transmission housing. These vibrations act each other vertically and laterally, thereby causing the exhaust pipe assembly to generate a complicated three-dimensional vibration. Due to this vibration as well as a torsion, a large stress acts on the exhaust pipe assembly and the supporting portion of the transmission housing where the common exhaust pipe is supported. This is an unfavorable factor in improving the durability of the exhaust pipe assembly and the supporting portion.

SUMMARY OF THE INVENTION

It is an object of the present invention to provide an exhaust system for use in an engine which has overcome the above-mentioned problems.

It is another object of the present invention to provide an automotive vehicle engine exhaust system which can suppress the generation of a three-dimensional vibration in an exhaust pipe assembly and reduce the stress acting on the exhaust pipe assembly to improve the durability.

Accordingly, the invention is directed to an exhaust system for a power plant which includes an engine and a transmission connected with the engine, the exhaust system comprising: a plurality of independent exhaust pipes connected with the engine, the plurality of independent exhaust pipes being combined into a single combined portion; a common exhaust pipe connected with the combined portion at an upstream end portion thereof, the common exhaust pipe being supported on the transmission at an intermediate supporting portion thereof, a part between the upstream end portion and the intermediate supporting portion being an upstream part of the common exhaust pipe; and one of the plurality of independent exhaust pipes and the upstream part of the common exhaust pipe being, when viewed from above, substantially parallel with a rolling axis of the power plant.

In the above construction, the plurality of independent exhaust pipes extending from respective exhaust manifolds are combined and connected with the common exhaust pipe, which is supported on the transmission at the intermediate supported portion. One independent exhaust pipe and the upstream part of the common exhaust pipe are formed such that they are substantially parallel with the power plant rolling axis when viewed downward from above. Accordingly, even if the engine vibration and the vibration of the power plant are transmitted through the portion supported on the transmission, the exhaust pipe assembly vibrates only two-dimensionally since the vibration acts in the same plane with the rolling axis. Thus, there exists no such strained force which acts when the above portion of the exhaust pipe assembly is not parallel with the rolling axis, with the result that the three-dimensional vibration such as a torsion is prevented from generating and the durability of the exhaust pipe assembly can be improved.

The other independent exhaust pipe may be connected with the one independent exhaust pipe through an expandable and bendable flexible tube. Since the flexible tube absorbs the vibration, the vibration of the other exhaust pipe is transmitted to the one independent exhaust pipe at a suppressed level.

The engine may be a longitudinally mounted engine, particularly, longitudinally mounted V-shaped engine having first and second banks. In this case, the independent exhaust pipes are connected on respective outer sides of the first and second banks. An independent exhaust pipe connected with the first bank is parallel with the rolling axis, and the independent exhaust pipe connected with the second bank extends from the outer side of the second bank in a direction substantially normal to the rolling axis below the engine to the combined portion.

With this arrangement, the aforementioned action and effect can be obtained in the V-shaped engine. Also, the exhaust pipe assembly does not take up a large space and the independent exhaust pipes can be located as close to an upstream end of the exhaust pipe assembly as possible.

The portion of the independent exhaust pipe extending below the engine may be preferably spaced away from a front cross member for carrying front wheels in a forward and backward direction. Further, the engine may be advantageously mounted behind the front cross member. Accordingly, there can be provided a space in which the independent exhaust pipe can be arranged without interfering the front cross member. The independent exhaust pipe can be arranged easily.

A catalyzer unit may be provided at an intermediate position of the portion of the exhaust pipe assembly from one of the plurality of independent exhaust pipes to the intermediate supporting portion of the common exhaust pipe, particularly, in a specified position of the upstream part, and may be formed so as to be substantially parallel with the power plant rolling axis when viewed downward from above.

The provision of the catalyzer unit in such a position is advantageous in activating the catalyzer. Further, since the catalyzer unit is substantially parallel with the power plant rolling axis when viewed downward from above, the vibration can be effectively suppressed.

The common exhaust pipe may be preferably supported on the transmission movably in an axial direction thereof at the intermediate supporting portion. Accordingly, the expansion of the common exhaust pipe in the forward and backward direction due to the vibration and the thermal expansion can be effectively absorbed at the intermediate supporting portion.

The common exhaust pipe may be preferably supported on the transmission in such a manner as to permit a rolling movement of the power plant relative to the common exhaust pipe. Accordingly, rolling vibrations of the power plant is prevented from being transmitted to the common exhaust pipe. The three-dimensional vibration of the exhaust pipe assembly can be further suppressed.

A flexible tube which permits the common exhaust pipe to expand in the forward and backward direction may be advantageously provided at a specified position of the common exhaust pipe downstream from the intermediate supporting portion. The expansion of the common exhaust pipe in the forward and backward direction due to the vibration and the thermal expansion can be effectively absorbed by the flexible tube.

These and other objects, features and advantages of the present invention will become more apparent upon a reading of the following detailed description and accompanying drawings.

DETAILED DESCRIPTION OF PREFERRED EMBODIMENTS OF THE INVENTION

Figure 1:
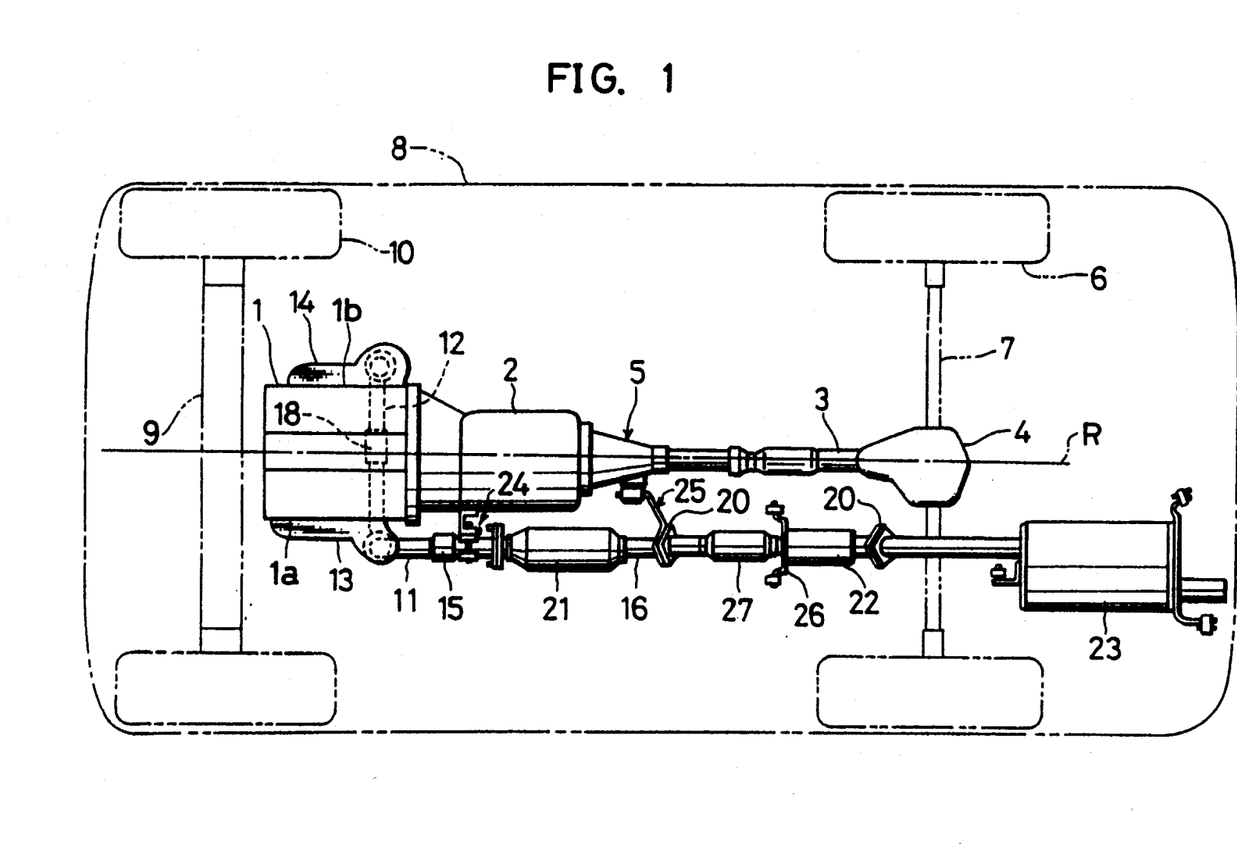
FIG. 1 is a plan view showing an exhaust system for use in an automotive vehicle engine as an embodiment of the invention.
Figure 2:
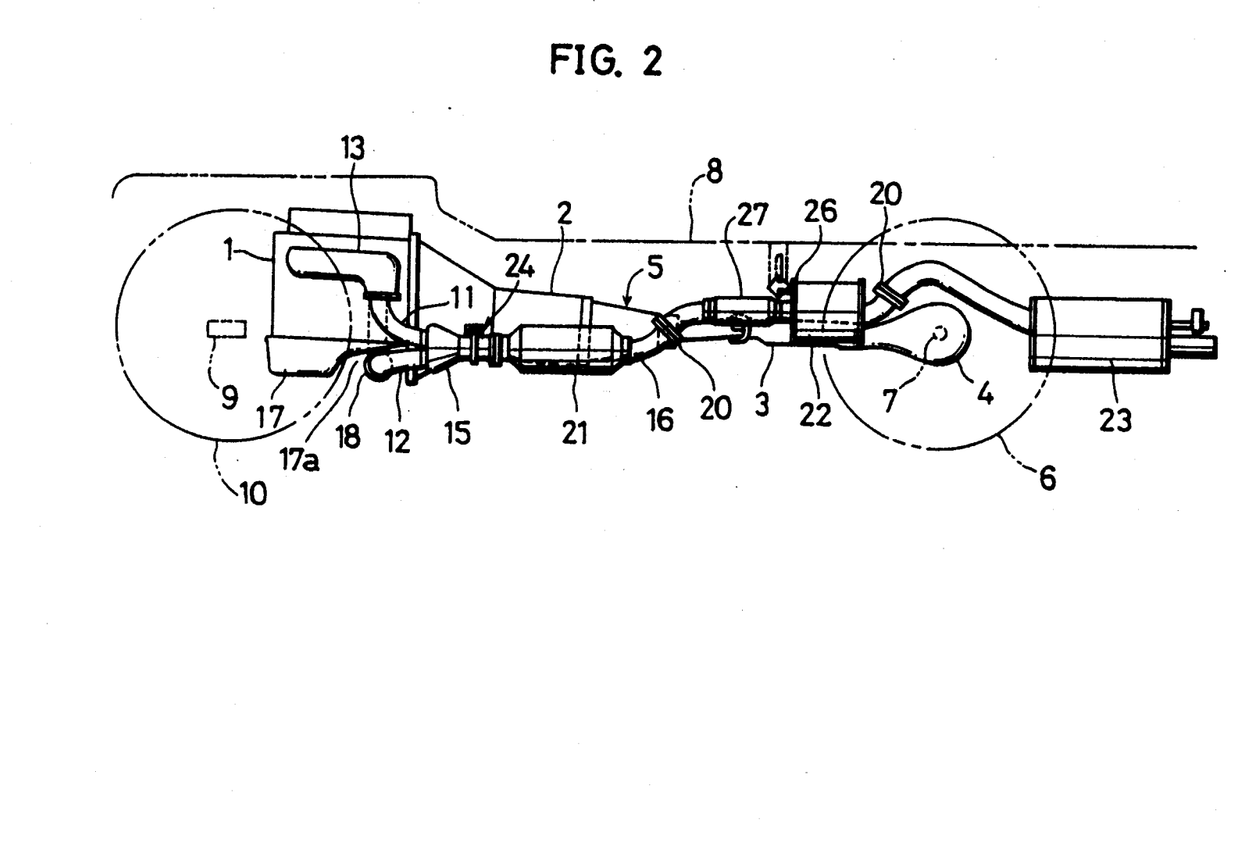
FIG. 2 is a side elevation view showing the exhaust system.

FIGS. 1 and 2 show an embodiment of the invention. Indicated at 1 is an engine, which is a V-shaped engine longitudinally mounted such that first and second banks 1a, 1b are opposed to each other with respect to a widthwise direction of an automotive vehicle and an engine output shaft extends in the lengthwise direction of the automotive vehicle. A transmission 2 is connected with the back side of the engine 1. In the illustrated embodiment, a propeller shaft 3 extends backward from a rear end of the transmission 2 and a differential 4 is connected to a rear end of the propeller shaft 3. The engine 1, the transmission 2, the propeller shaft 3 and the differential 4 constitute a power plant 5 of the FR (Front engine Rear drive) type. A front cross member 9 is disposed in front of the engine 1 in a body 8 and front wheels 10 are supported at opposite sides of the member 9. An automotive vehicle of the box type having a long nose is an example of the vehicles in which the front cross member 9 is disposed in front of the engine 1.

Two exhaust pipes (upstream exhaust pipes) 11 and 12 constituting an upstream part of an exhaust pipe assembly are connected to the engine 1, with spaced apart from each other in the widthwise direction of the automotive vehicle. In this embodiment, there are provided the first exhaust pipe 11 corresponding to the first bank 1a and the second exhaust pipe 12 corresponding to the second bank 1b.

The front cross member 9 and the part of the exhaust pipe 12 extending below the engine 1 are spaced apart in the lengthwise direction of the automotive vehicle. Downstream ends of the exhaust pipes 11 and 12 are connected to a combined portion 15 and a common exhaust pipe constituting a downstream part of the exhaust pipe assembly is connected to the combined portion 15.

A one-dot-chain line in FIG. 1 represents a rolling axis R of the power plant 5, which extends substantially in a longitudinal direction of the power plant 5. The axis R is a center of vibration when the power plant 5 vibrates as the engine 1 operates.

A portion of the exhaust pipe assembly according to the invention from one of the exhaust pipes 11 and 12 to at least an intermediate portion (for example, a second supporting device to be described later) of the common exhaust pipe 16 where the pipe 16 is supported on the transmission housing is, when viewed downward from above, formed so that this portion is substantially parallel with the power plant rolling axis R. As shown in FIG. 1, the first exhaust pipe 11, the combined portion 15 and the common exhaust pipe 16 extend, beside the outer side wall of the first bank located at the left side (lower side in FIG. 1) when viewed from behind of the vehicle, backward in the lengthwise direction of the vehicle linearly and substantially in parallel with the power plant rolling axis R. When viewed from the side of the vehicle, the first exhaust pipe 11 extends backward bendingly from the bottom of the exhaust manifold 13 to the combined portion 15. The common exhaust pipe 16 is also bent partially and slightly in the vertical direction.

The combined portion 15 of the exhaust pipes 11 and 12 is located behind the outer rear end of the first bank 1a and relatively near the downstream end of the exhaust pipe assembly. The second exhaust pipe 12 extends below the engine 1 to the combined portion 15. Specifically, the second exhaust pipe 12 is formed as follows. The second exhaust pipe 12 extends downward from an outer side portion of the second bank 1b, and is bent below the engine 1 so as to extend in a direction substantially normal to the power plant rolling axis R until a position below the outer end of the first bank 1a through a space 17a located behind an oil pan 17 disposed at the bottom of the engine 1. At this position, the pipe 12 is bent backward so as to reach the combined portion 15.

An expandable and bendable flexible tube 18 is provided to absorb the vibration at an intermediate position of the second exhaust pipe 12.

The common exhaust pipe 16 constitutes the most part of the exhaust pipe assembly and extends from the combined portion 15 backward to the rear end of the vehicle. The passage 16 is comprised of a plurality of partial passages, which are coupled with flanges 20.

The passage 16 is provided with a catalyzer unit 21 at an upstream position thereof, and a pre-silencer 22 and a main silencer 23 at downstream positions thereof. The exhaust pipe assembly is supported on the power plant 5 at a position downstream from the combined portion 15. In the illustrated example, the common exhaust pipe 16 is provided with first and second supporting devices 24 and 25, which are fixed to the power plant 5, at a position near the upstream end and an intermediate position.

Figure 3A:
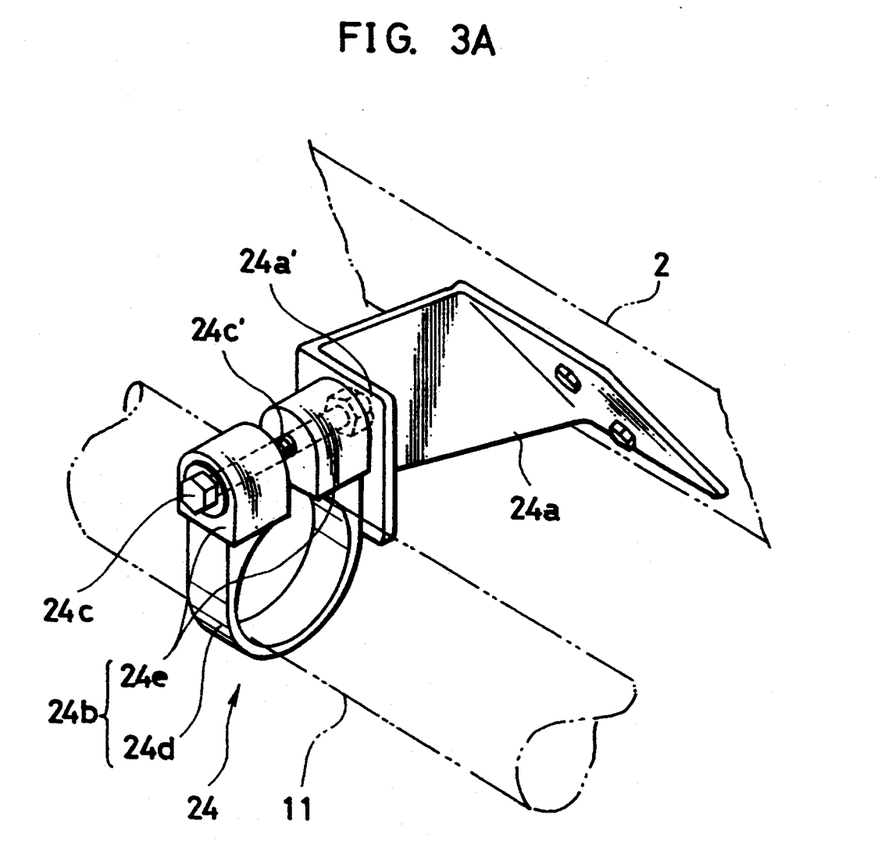
FIGS. 3A and 3B are perspective views showing first supporting devices of the exhaust system.

FIG. 3A is an enlarged perspective view showing the first supporting device 25. As shown in FIG. 3A, the first supporting device includes a U-shaped bracket 24a screwed to a bottom slanting face of a housing of the transmission 2, and a holding member 24b mounted on a front face of a mounting portion 24a' formed at a leading end of the bracket 24a with a bolt 24c. In the mounting portion 24a' is formed an hole through which the bolt 24c is passed.

The holding member 24b includes a U-shaped band portion 24d for holding the common exhaust pipe 16 and a pair of fastening portions 24e which are formed at opposite sides of the band portion 24d so as to oppose to each other. The fastening portions 24e each have a through hole 24c' for allowing the bolt 24c to pass therethrough.

The bolt 24c is passed through the holes 24c' of the fastening portions 24e while the first exhaust pipe 11 is held by the band portion 24d of the holding member 24b. A leading end of the bolt 24c is further inserted through the hole formed in the mounting piece 24a'. An nut 24f is screwedly fitted to an end portion of the bolt 24c projecting from the mounting piece 24a', with the result that the common exhaust pipe 16 can be slidably but securely held by the first supporting device 24.

Figure 3B:
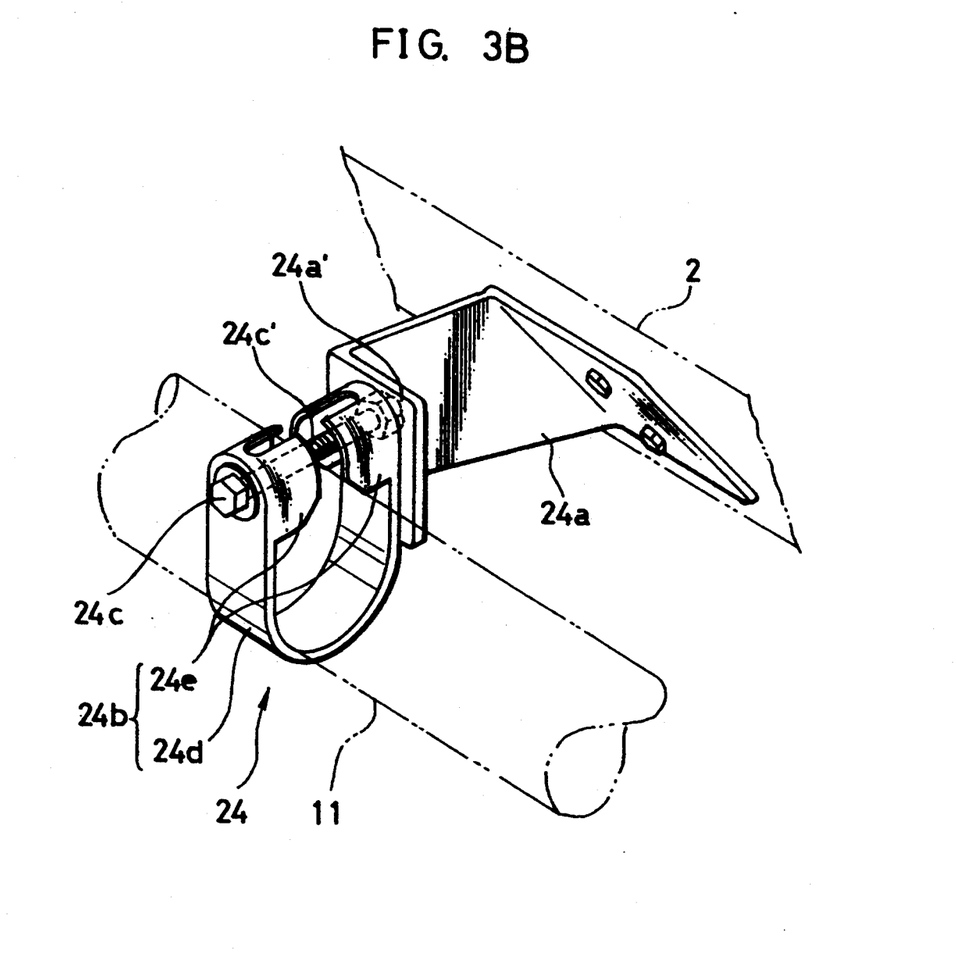

FIG. 3B shows another first supporting device 24 which is identical to the first supporting device 24 shown in FIG. 3A except for the fastening portions 24e being formed by uniform walls. This construction makes it possible to form the fastening portions 24e by press-working a metal plate.

Figure 4:
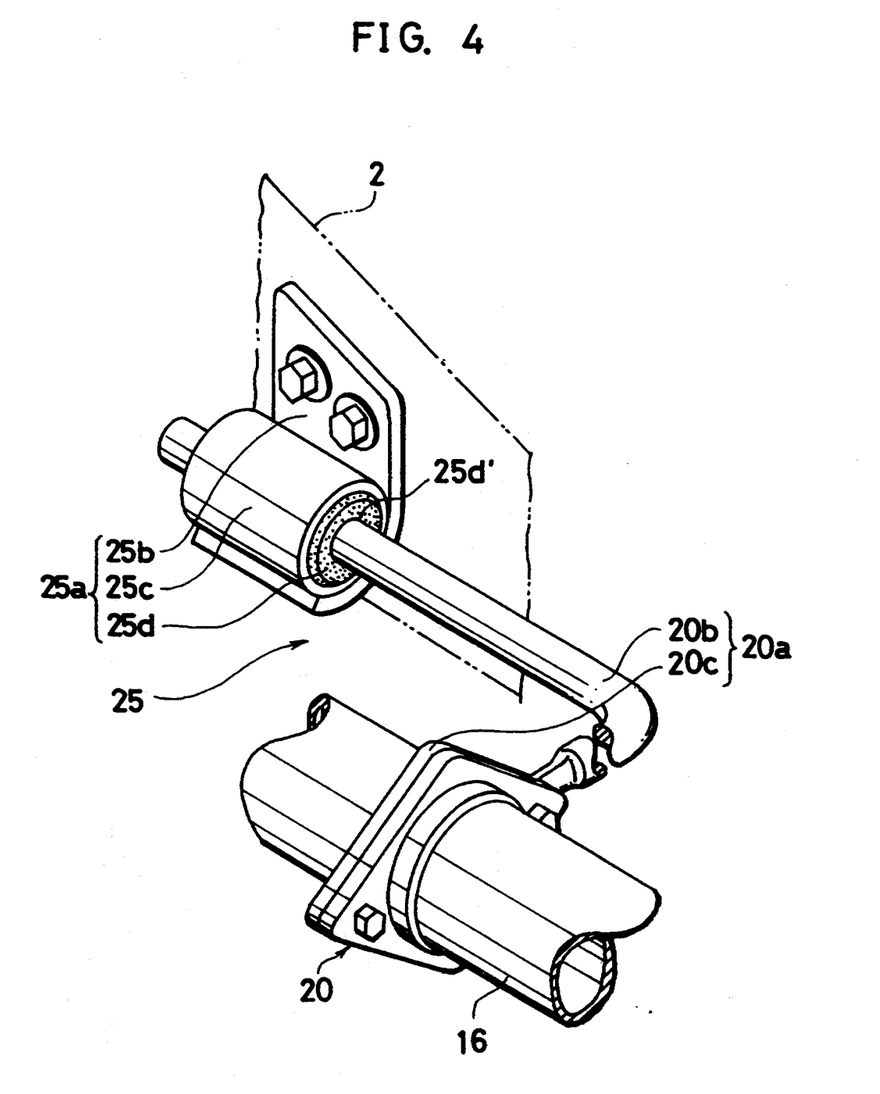
FIG. 4 is a perspective view, partially taken away, showing a second supporting device of the exhaust system.

FIG. 4 is an enlarged perspective view showing the second supporting device 25. As shown in FIG. 4, the second supporting device 25 includes a fixing member 25a which is fixed on the rear part of the transmission housing and a connecting member 20a. One end of the connecting member 20a is supported on the fixing member 25a and the other end thereof being connected with the common exhaust pipe 16.

The fixing member 25a includes a J-shaped bracket 25b fixed on the rear part of the transmission housing with bolts, a hollow cylindrical member 25c which is fitted in and welded with a curved portion formed at a lower part of the bracket 25c, and a rubber member 25d which is fitted and fixed in the cylindrical member 25c and has a through hole 25d'. The connecting member 20a includes a connecting bar 20b, one end of which is slidably fitted into the hole 25d' of the rubber member 25d, and a fitting 20c which is formed integrally with the connecting bar 20b at the other end thereof and constitutes one of a pair of flanges 20.

Thus, the common exhaust pipe 16 which is arranged at the side of the transmission 2 and is thus most subject to the vibration of the power plant 5 is supported securely by means of the first and second supporting devices 24 and 25. The vibrations acting in the lengthwise direction can be securely absorbed at the supported portions of the common exhaust pipe 16 through the sliding motion of the passage 16 in the lengthwise direction in the holder 24d of the first supporting device 24 and through the sliding motion of the connecting bar 20b in the lengthwise direction in the hole 25d' of the rubber member 25d.

In this embodiment, the catalyzer unit 21 is provided between the first and second supporting devices 24 and 25, so that the expansion of the common exhaust pipe 16 in the lengthwise direction due to the vibration of the power plant 5 and the thermal expansion can be flexibly compensated for.

Further, a third supporting device 26 for supporting the common exhaust pipe 16 on the body 8 is provided downstream from the supporting devices 24 and 25. The third supporting device 26 may be, for example, such that a fitting secured at a front end face of the pre-silencer 22 is connected with a frame of the body 8 through a rubber or the like. Between the supporting devices 25 and 26 is provided the flexible tube for absorbing the vibration acting on the common exhaust pipe 16 downstream from the second supporting device 25.

In the exhaust system constructed as described above, the portion of the exhaust pipe from the first exhaust pipe 11 to the common exhaust pipe 16 is formed so that it extends linearly and substantially in parallel with the power plant rolling axis R when viewed downward from above. Accordingly, even if the exhaust system receives the vibration of the engine 1 and the vibration generated due to the power plant bending, there will not occur the three-dimensional vibration to cause a torsion in the exhaust system. Even if the engine vibration is transmitted through the upstream part of the exhaust pipe assembly and the vibration generated due to the power plant bending is transmitted through the second supporting device 25 fixed on the transmission 2, these vibrations act only in the vertical direction. Further, since the first and second exhaust pipes 11 and 12 are assembled at the position near the upstream end of the exhaust pipe assembly, the vibrations of the exhaust pipes 11 and 12 do not act on the downstream part of the exhaust pipe assembly. This sufficiently reduces the vibration of the common exhaust pipe 16 constituting the most part of the exhaust pipe assembly.

Particularly, since the second exhaust pipe 12 is formed so as to extend below the engine 1 to the combined portion 15 (in the direction substantially normal to the lengthwise direction of the vehicle), the combined portion 15 is allowed to locate as close to the upstream end of the exhaust pipe assembly as possible.

The flexible tube 18 provided at the intermediate position of the second exhaust pipe 12 absorbs the vibration of the pipe 12, thereby further suppressing the generation of the three-dimensional vibration.

Further, since the supporting devices 24 and 25 for supporting the exhaust pipe assembly on the power plant 5 are provided at the positions more downstream than the combined portion 15, a stress resulting from the vibration acting on the supported portions of the exhaust pipe assembly can be reduced.

The common exhaust pipe 16 is formed into a linear shape when viewed downward from above. This shape is not specially employed for the V-shaped engine. It is also possible to connect this common exhaust pipe 16 with the upstream part of the exhaust pipe assembly for an in-line engine. Thus, the common exhaust pipe 16 constituting the most part of the exhaust pipe assembly can be commonly used for the V-shaped engine and the in-line engine.

Figure 5:
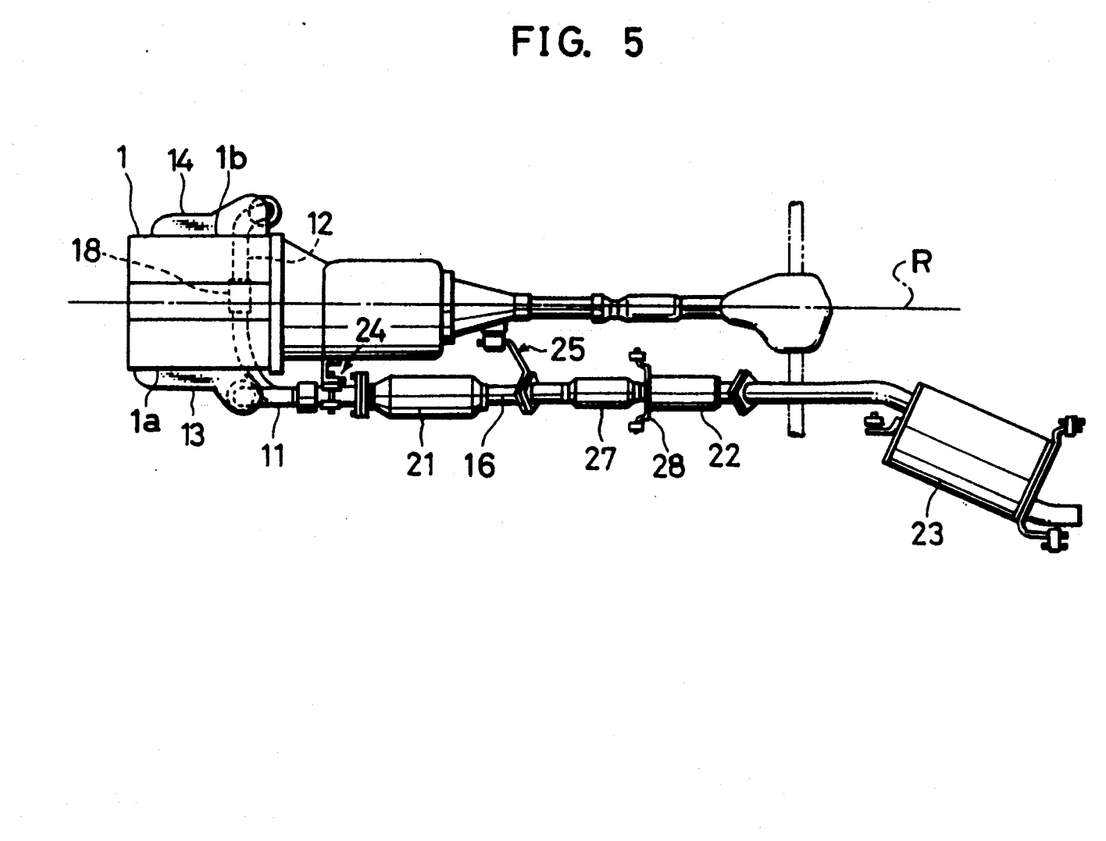
FIG. 5 is a plan view showing an essential portion of an exhaust system as another embodiment.
Figure 6:
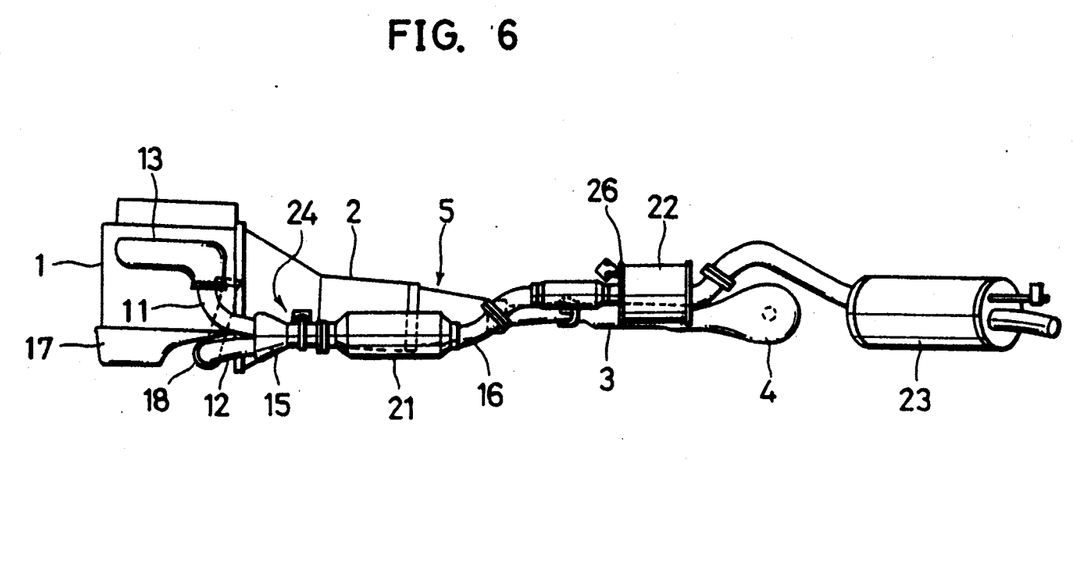
FIG. 6 is a side elevation view showing the another exhaust system.

In the embodiment shown in FIGS. 1 and 2, a connecting portion of the first exhaust pipe 11 with the exhaust manifold 13 and that of the second exhaust pipe 12 with the exhaust manifold 14 are located at the same position in the side view. However, as shown in FIGS. 5 and 6, the upstream ends of the exhaust pipes 11 and 12 may be offset each other in the lengthwise direction in view of the arrangement of the cylinders in the banks 1a and 1b. In this case, the second exhaust pipe 12 extends obliquely downward from the connecting portion with the exhaust manifold 14 before it is bent to extend below the engine 1.

It is sufficient that the first exhaust pipe 11 and the common exhaust pipe 16 be substantially parallel with the power plant rolling axis R. For example, there is no problem in slightly bending the rear end of the common exhaust pipe 16 because of the layout need to provide a space for storing a spare tire or other reason.

The system according to the invention is applicable not only to the V-shaped engine, but also to an engine having a plurality of exhaust pipes, such as a horizontal opposed type engine.

What is claimed is:

1. An exhaust system for a power plant which includes an engine and a transmission connected with the engine, the exhaust system comprising:
   a plurality of independent exhaust pipes connected with the engine, the plurality of independent exhaust pipes being combined into a single combined portion;
   a common exhaust pipe connected with the combined portion at an upstream end portion thereof, the common exhaust pipe being supported on the transmission at an intermediate supporting portion thereof, a part between the upstream end portion and the intermediate supporting portion being an upstream part of the common exhaust pipe; and
   one of the plurality of independent exhaust pipes and the upstream part of the common exhaust pipe being, when viewed from above, substantially parallel with a rolling axis of the power plant.

2. An exhaust system as defined in claim 1 wherein the other independent exhaust pipes are connected with the one independent exhaust pipe by way of an expandable and bendable flexible tube.

3. An exhaust system as defined in claim 2 wherein the engine has an output shaft extending in a longitudinal direction of a vehicle.

4. An exhaust system as defined in claim 3 wherein the engine is a longitudinally mounted V-shaped engine having first and second banks, the independent exhaust pipes are connected on respective outer sides of the first and second banks.

5. An exhaust system as defined in claim 4 wherein an independent exhaust pipe connected with the first bank is parallel with the rolling axis, and the independent exhaust pipe connected with the second bank extends from the outer side of the second bank in a direction substantially normal to the rolling axis below the engine to the combined portion.

6. An exhaust system as defined in claim 1 wherein the engine has an output shaft extending in a longitudinal direction of a vehicle.

7. An exhaust system as defined in claim 6 wherein the engine is a longitudinally mounted V-shaped engine having first and second banks, the independent exhaust pipes are connected on respective outer sides of the first and second banks.

8. An exhaust system as defined in claim 7 wherein an independent exhaust pipe connected with the first bank is parallel with the rolling axis, and the independent exhaust pipe connected with the second bank extends from the outer side of the second bank in a direction substantially normal to the rolling axis below the engine to the combined portion.

9. An exhaust system as defined in claim 8 wherein the independent exhaust pipe extending below the engine is spaced away in a longitudinal direction of a vehicle from a front cross member for supporting front wheels.

10. An exhaust system as defined in claim 9 wherein the engine is mounted behind the front cross member.

11. An exhaust system as defined in claim 7 wherein a catalyzer unit is provided in a specified portion of an independent exhaust pipe, the combined portion, and the upstream part of the common exhaust pipe, the catalyzer unit being substantially parallel with the rolling axis when viewed from above.

12. An exhaust system as defined in claim 11 wherein a catalyzer unit is provided in a specified portion of the upstream part of the common exhaust pipe, the catalyzer unit being substantially parallel with the rolling axis when viewed from above.

13. An exhaust system as defined in claim 1 wherein a catalyzer unit is provided in a specified portion of an independent exhaust pipe, the combined portion, and the upstream part of the common exhaust pipe, the catalyzer unit being substantially parallel with the rolling axis when viewed from above.

14. An exhaust system as defined in claim 13 wherein a catalyzer unit is provided in a specified portion of the upstream part of the common exhaust pipe, the catalyzer unit being substantially parallel with the rolling axis when viewed from above.

15. An exhaust system as defined in claim 1 wherein the common exhaust pipe is supported on the transmission by a member operable to permit a relative axial movement between the common exhaust pipe and the transmission.

16. An exhaust system as defined in claim 15 wherein the common exhaust pipe has at a portion downstream from the intermediate supporting portion a flexible tube for permitting the common exhaust pipe to expand in an axial direction thereof.

17. An exhaust system as defined in claim 1 wherein the common exhaust pipe is supported on the transmission by a member operable to permit a rolling movement of the power plant relative to the common exhaust pipe.

18. An exhaust system as defined in claim 17 wherein the common exhaust pipe has at a portion downstream from the intermediate supporting portion a flexible tube for permitting the common exhaust pipe to expand in an axial direction thereof.

19. An exhaust system as defined in claim 1 wherein the common exhaust pipe has at a portion downstream from the intermediate supporting portion a flexible tube for permitting the common exhaust pipe to expand in an axial direction thereof.

* * * * *